United States Patent
Yoshida

(10) Patent No.: US 10,893,252 B2
(45) Date of Patent: Jan. 12, 2021

(54) IMAGE PROCESSING APPARATUS AND 2D IMAGE GENERATION PROGRAM

(71) Applicant: EmbodyMe, Inc., Tokyo (JP)

(72) Inventor: Issei Yoshida, Tokyo (JP)

(73) Assignee: EMBODYME, INC., Tokyo (JP)

(*) Notice: Subject to any disclaimer, the term of this patent is extended or adjusted under 35 U.S.C. 154(b) by 0 days.

(21) Appl. No.: 16/498,875

(22) PCT Filed: Apr. 4, 2019

(86) PCT No.: PCT/JP2019/014985
§ 371 (c)(1),
(2) Date: Sep. 27, 2019

(87) PCT Pub. No.: WO2019/194282
PCT Pub. Date: Oct. 10, 2019

(65) Prior Publication Data
US 2020/0092529 A1    Mar. 19, 2020

(30) Foreign Application Priority Data

Apr. 6, 2018  (JP) .................................. 2018-073826

(51) Int. Cl.
*H04N 13/139* (2018.01)
*H04N 13/204* (2018.01)
(Continued)

(52) U.S. Cl.
CPC ......... *H04N 13/139* (2018.05); *G06K 9/6215* (2013.01); *G06K 9/6267* (2013.01); *G06N 20/00* (2019.01); *H04N 13/204* (2018.05)

(58) Field of Classification Search
None
See application file for complete search history.

(56) References Cited

U.S. PATENT DOCUMENTS

2005/0008199 A1* 1/2005 Dong ................. G06K 9/00288
                                                          382/115
2008/0008399 A1    1/2008 Marugame et al.
(Continued)

FOREIGN PATENT DOCUMENTS

JP      2006-004158 A      1/2006
JP      2017-004065 A      1/2017
WO      WO2006/049147 A1   5/2006

OTHER PUBLICATIONS

Guo et al. "Photo-realistic Face Images Synthesis for Learning-based Fine-scale 3D Face Reconstruction" Cornell University Library, Aug. 3, 2017 (Year: 2017).*

(Continued)

*Primary Examiner* — Rebecca A. Volentine
(74) *Attorney, Agent, or Firm* — Polsinelli PC

(57) ABSTRACT

A 2D image generation unit 13 that generates 2D image data according to a predetermined 2D conversion algorithm from 3D data, and an evaluation value calculation unit 14 that calculates an evaluation value representing similarity between the generated 2D image data and captured image data used as a correct image are included. By the 2D image generation unit 13 repeatedly executing generation of 2D image data from 3D data and learning the 2D conversion algorithm to optimize the evaluation value calculated each time for 2D image data using highly accurate captured image data as a correct image, it is possible to generate a highly accurate 2D image from a 3D model even when 3D data of a highly accurate 3D model is not used.

10 Claims, 3 Drawing Sheets

(51) Int. Cl.
    *G06N 20/00*    (2019.01)
    *G06K 9/62*    (2006.01)

(56) References Cited

U.S. PATENT DOCUMENTS

2016/0291172 A1    10/2016   Ono et al.
2017/0116776 A1*   4/2017   Aughey ................. G06T 19/00
2018/0075592 A1*   3/2018   White ...................... G06T 7/75

OTHER PUBLICATIONS

Yudong Guo et al, "CNN-based Real-time Dense Face Reconstruction with Inverse-rendered Photo-realistic Face Images", Cornell University Library, Aug. 3, 2017.

G.Eckert et al, "Mesh based shape refinement for reconstructing 3D-objects from multiple images", The Institution of Electrical Engineers Conference Publication, Jan. 1, 2004, pp. 103-110.

Ming-Yu Liu et al, "Unsupervised Image-to-Image Translation Networks", 31$^{st}$ Conference on Neural Information Processing Systems (NIPS 2017), Long Beach, CA, pp. 1-11; Jul. 23, 2018.

Jun-Yan Zhu et al, "Unpaired Image-to-Image Translation using Cycle-Consistent Adversarial Networks", Berkeley AI Research (BAIR) laboratory, UC Berkeley; Nov. 18, 2018.

Supplementary European Search Report for counterpart European application 19774044 dated Feb. 19, 2020.

Tomonori Shindo; Outside board director is Mr. Kutaragi, A mystery AI venture at Ebisu, A new-type deep learning "generative model" to automated driving; Nikkei Robotics; Nov. 10, 2017; vol. 29; p. 3-12; ISSN 2189-5783; Especially see p. 11-12, Figs 2 and 6.

ISR of PCT/JP2019/014985.

\* cited by examiner

IMAGE PROCESSING APPARATUS AND 2D IMAGE GENERATION PROGRAM

CROSS REFERENCE TO RELATED APPLICATIONS

This application is a National Phase filing under 35 U.S.C. § 371 of PCT/JP2019/014985 filed on Apr. 4, 2019; which application in turn claims priority to Application No. JP 2018-073826 filed in Japan on Apr. 6, 2018. The entire contents of each application are hereby incorporated by reference.

TECHNICAL FIELD

The present invention relates to an image processing apparatus and a two-dimensional (2D) image generation program, and is particularly suitable for use in an apparatus that generates 2D image data from three-dimensional (3D) data of a 3D model.

BACKGROUND ART

Conventionally, a great number of technologies for generating a 3D model from a captured image have been provided in a computer graphics field. Among the technologies, there is a technology that uses machine learning to estimate a 3D shape from a 2D image (for example, see Patent Document 1).

Conversely, a technology for generating a 2D image from a 3D model has been known (for example, see Patent Document 2). Patent Document 2 discloses that a thumbnail image of a 3D model is created to include a feature portion of the 3D model in order to improve convenience of use and management of 3D model data.

A technology has been known in which a 3D model is created from a 2D image and a 2D image is created from a 3D model in both directions (for example, see Patent Document 3). An image processing apparatus described in Patent Document 3 is intended to enable easy correction to a natural face shape when correcting a captured face image. After generating a 3D model of a subject and mapping a captured image of the subject on a surface of the generated 3D model, a shape of the 3D model is deformed. Then, the deformed 3D model is projected in a direction in which the captured image is mapped, and 2D planar image obtained thereby is used as a processing result image.

Patent Document 1: WO 06/049147 A
Patent Document 2: JP-A-2017-4065
Patent Document 3: JP-A-2006-4158

SUMMARY OF THE INVENTION

Technical Problem

Incidentally, since the 2D image created in the image processing apparatus described in Patent Document 2 is a thumbnail image including the feature portion of the 3D model, there is no great necessity of generating the thumbnail image itself with high accuracy. On the other hand, since the image processing apparatus described in Patent Document 3 aims to obtain a 2D image corrected to a natural face shape, it is required to generate the 2D image with high accuracy and with a quality of a certain level or higher. There are many needs other than the use case described in Patent Document 3 to generate a highly accurate 2D image from a 3D model. The highly accurate 2D image mentioned here is a 2D image comparable to a captured image.

However, in the case of generating a 2D image from a 3D model, in order to generate the 2D image with high accuracy, it has been conventionally necessary to generate the 3D model itself with high accuracy. In addition, it is necessary to accurately map (paste) the captured image to the 3D model. Furthermore, when a 3D model to which a captured image is mapped is converted into a 2D image, a highly accurate 2D image may not be obtained merely by performing simple projection as in Patent Document 3. In other words, it is necessary to faithfully simulate every actual physical phenomenon of light and to perform conversion processing so as to reflect a simulation result. However, it is difficult to actually perform processing that satisfies all of these conditions, and it has been a fact that a highly accurate 2D image may not be generated from a 3D model.

The invention has been made to solve such a problem, and an object of the invention is to be able to generate a highly accurate 2D image comparable to a captured image from a 3D model.

Solution to Problem

To solve the problem, the invention includes a 2D image generation unit that generates 2D image data according to a predetermined 2D conversion algorithm from 3D data, and an evaluation value calculation unit that calculates an evaluation value representing similarity between the generated 2D image data and captured image data used as a correct image, and the 2D conversion algorithm of the 2D image generation unit is modified by learning to optimize the evaluation value calculated each time for 2D image data generated when 3D data is input to the 2D image generation unit and processing is repeatedly performed.

Advantageous Effects of the Invention

According to the invention configured as described above, generation of 2D image data from 3D data by the 2D image generation unit is repeatedly executed while modifying the 2D conversion algorithm. In this instance, the 2D conversion algorithm evolves by learning so that the evaluation value calculated each time for the 2D image data generated by the 2D image generation unit is optimized using highly accurate captured image data as a correct image. In this way, even when 3D data of a highly accurate 3D model is not used, it is possible to generate a highly accurate 2D image that is comparable to a captured image from the 3D model.

DESCRIPTION OF EMBODIMENTS

Figure 1:
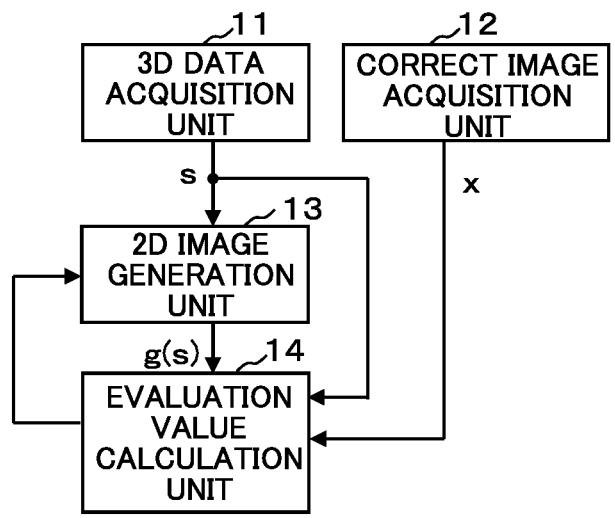
FIG. 1 is a block diagram illustrating a functional configuration example of an image processing apparatus according to the present embodiment.

Hereinafter, an embodiment of the invention will be described with reference to drawings. FIG. 1 is a block diagram illustrating a functional configuration example of an image processing apparatus according to the present embodiment. As illustrated in FIG. 1, the image processing apparatus according to the present embodiment includes, as a functional configuration thereof, a 3D data acquisition unit 11, a correct image acquisition unit 12, a 2D image generation unit 13, and an evaluation value calculation unit 14. Each of these functional blocks 11 to 14 can be configured by any of hardware, a digital signal processor (DSP), and software. For example, in the case of being configured by software, each of the functional blocks 11 to 14 actually includes a CPU, a RAM, a ROM, etc. of a computer, and is realized by operation of a program stored in a recording medium such as a RAM, a ROM, a hard disk, or a semiconductor memory.

The 3D data acquisition unit 11 acquires 3D data of a 3D model in which a captured image is mapped on a surface. The 3D data acquired by the 3D data acquisition unit 11 may not correspond to 3D data of a highly accurate 3D model. Here, the 3D data of the highly accurate 3D model refers to data in which a 3D shape of an object is faithfully represented by a 3D model, and mapping (pasting) of a captured image to the 3D model is accurately performed. The 3D data acquired by the 3D data acquisition unit 11 of the present embodiment may not be highly accurate data to this extent. For example, the 3D data acquired by the 3D data acquisition unit 11 may correspond to data obtained by converting 2D captured image data into a 3D model using a known technology.

The correct image acquisition unit 12 acquires 2D captured image data used as a correct image for learning. For example, the captured image data acquired by the correct image acquisition unit 12 can correspond to captured image data used as a generation source of the 3D data acquired by the 3D data acquisition unit 11.

The 2D image generation unit 13 generates 2D image data from the 3D data acquired by the 3D data acquisition unit 11 according to a predetermined 2D conversion algorithm. Note that, hereinafter, this 2D conversion algorithm is represented by a symbol "g( )". As the 2D conversion algorithm used here, a known algorithm can be used. However, as will be described later, since this 2D conversion algorithm is modified by learning, the algorithm needs to be modifiable.

Note that, in the present embodiment, for example, modifying of the 2D conversion algorithm includes at least one of changing of a conversion processing logic when a value on 3D space coordinates specifying the 3D data is converted into a value on 2D space coordinates specifying the 2D image data, changing of a function or a parameter used in the conversion processing logic, and changing of a library used in the conversion processing logic.

The evaluation value calculation unit 14 calculates an evaluation value representing similarity between the 2D image data generated by the 2D image generation unit 13 and the captured image data acquired by the correct image acquisition unit 12. Then, the 2D image generation unit 13 modifies the 2D conversion algorithm by learning to optimize an evaluation value calculated each time for 2D image data generated when the 3D data is input to the 2D image generation unit 13 and processing is repeatedly performed.

In the present embodiment, the 2D image generation unit 13 learns the 2D conversion algorithm by applying four patterns shown below. FIG. 2 to FIG. 5 illustrate specific functional configuration examples of the image processing apparatus in the case of performing learning using these four patterns. Hereinafter, learning of the four patterns will be described in order.

<First Pattern>

Figure 2:
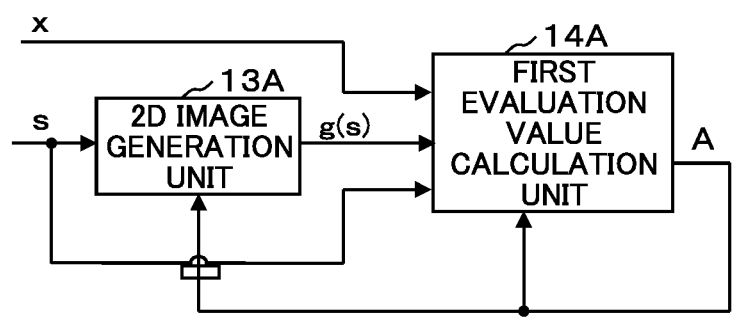
FIG. 2 is a block diagram illustrating a functional configuration example in the case of performing learning according to a first pattern.

FIG. 2 is a block diagram illustrating a functional configuration example in the case of performing learning according to a first pattern. Learning according to the first pattern applies a learning algorithm known as a so-called a generative adversarial network (GAN). As illustrated in FIG. 2, the image processing apparatus includes a 2D image generation unit 13A and a first evaluation value calculation unit 14A as a functional configuration for performing learning according to the first pattern. The 2D image generation unit 13A corresponds to a unit generally referred to as a generator in the GAN. Meanwhile, the first evaluation value calculation unit 14A corresponds to a unit generally referred to as a discriminator in the GAN.

The first evaluation value calculation unit 14A uses the 3D data acquired by the 3D data acquisition unit 11 (hereinafter represented by a symbol "s"), the captured image data acquired by the correct image acquisition unit 12 as a correct image (hereinafter represented by a symbol "x", which may be described as a correct image x), or the 2D image data generated from the 3D data s by the 2D image generation unit 13A (hereinafter represented by a symbol "g(s)") as an input, identifies whether an input image is the correct image x or the 2D image data g(s) generated by the 2D image generation unit 13A according to a predetermined identification algorithm, and calculates a probability that the input image is identified as the correct image as a first evaluation value (hereinafter represented by a symbol "A").

The image processing apparatus modifies the 2D conversion algorithm of the 2D image generation unit 13A to maximize the first evaluation value A calculated by the first evaluation value calculation unit 14A using the 2D image data g(s) as an input. In addition, the image processing apparatus modifies the identification algorithm of the first evaluation value calculation unit 14A to minimize the first evaluation value A calculated by the first evaluation value calculation unit 14A using the 2D image data g(s) as an input and maximize the first evaluation value A calculated by the first evaluation value calculation unit 14A using the captured image data (correct image) x as an input. Modifying of the identification algorithm includes at least one of changing of an identification processing logic at the time of identifying whether an input image is a correct image, changing of a function or a parameter used in the identification processing logic, and changing of a library used in the identification processing logic.

Here, modifying of the identification algorithm of the first evaluation value calculation unit 14A to minimize the first evaluation value A calculated by the first evaluation value calculation unit 14A using the 2D image data g(s) as an input and maximize the first evaluation value A calculated by the first evaluation value calculation unit 14A using the correct image x as an input means that learning is performed to improve the ability to identify whether an input image is a correct image or not by the first evaluation value calculation unit 14A corresponding to an identifier. When the identification ability is enhanced, the first evaluation value calculation unit 14A can identify an image as an incorrect image even when the image is slightly different from a correct image.

Meanwhile, modifying of the 2D conversion algorithm of the 2D image generation unit 13A to maximize the first evaluation value A calculated by the first evaluation value calculation unit 14A using the 2D image data g(s) as an input means that learning is performed to improve the ability to generate the 2D image data g(s), which may not be identified by the first evaluation value calculation unit 14A as a correct image or not, by the 2D image generation unit 13A. When the generation ability is enhanced, the 2D image generation unit 13A can generate the 2D image data g(s) which is almost the same as a correct image.

In practice, learning by the 2D image generation unit 13A and learning by the first evaluation value calculation unit 14A are alternately repeated. In this way, the 2D image generation unit 13A (generator) generates the 2D image data g(s) that can deceive the first evaluation value calculation unit 14A into determining that the 2D image data g(s) is as close as possible to the correct image x, and the first evaluation value calculation unit 14A (discriminator) performs learning to distinguish between the 2D image data g(s) generated by the 2D image generation unit 13A so as to resemble the correct image and the correct image x as much as possible. As a result, as learning progresses, the 2D image generation unit 13A can generate the 2D image data g(s) indistinguishable from the captured image data x.

<Second Pattern>

Figure 3:
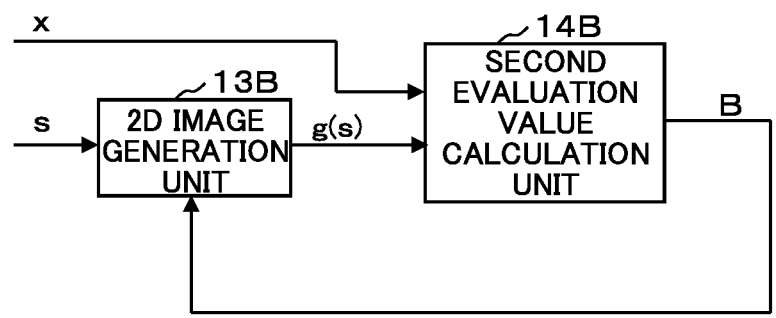
FIG. 3 is a block diagram illustrating a functional configuration example in the case of performing learning according to a second pattern.

FIG. 3 is a block diagram illustrating a functional configuration example in the case of performing learning according to a second pattern. Learning according to the second pattern applies a loss function of a learning algorithm known as so-called style transformation (neural style transfer). As illustrated in FIG. 3, the image processing apparatus includes a 2D image generation unit 13B and a second evaluation value calculation unit 14B as a functional configuration for performing learning according to the second pattern.

The second evaluation value calculation unit 14B has a learned neural network for image classification of 2D image data. Hereinafter, the neural network is represented by a symbol "$\Phi$", and each layer of the network is represented by $\Phi\_L$. The second evaluation value calculation unit 14B calculates, as a second evaluation value (hereinafter represented by a symbol "B"), a total value or an average value of differences between values related to the captured image data x acquired by the correct image acquisition unit 12 and the 2D image data g(s) generated by the 2D image generation unit 13B, respectively, in each layer $\Phi\_L$ included in the neural network $\Phi$.

That is, the correct image x acquired by the correct image acquisition unit 12 and the 2D image data g(s) generated by the 2D image generation unit 13B are input to an input layer (first layer) $\Phi\_1$ of the neural network $\Phi$. In the second layer $\Phi\_2$ of the neural network $\Phi$, a feature map is generated by mapping feature quantity groups extracted from the correct image x and the 2D image data g(s) of the first layer $\Phi\_1$. In the third layer $\Phi\_3$ of the neural network $\Phi$, feature maps are generated by mapping feature quantity groups further respectively extracted from the feature maps of the second layer $\Phi\_2$ corresponding to the correct image x and the 2D image data g(s), respectively. In a similar manner, a feature map is generated in the third and subsequent layers $\Phi\_L$ (L=3, 4, . . . ).

For example, the second evaluation value calculation unit 14B calculates a sum or an average value of differences between color values at respective pixels of the correct image x and color values at respective pixels of the 2D image data g(s) in the first layer $\Phi\_1$ of the neural network $\Phi$ (hereinafter, the sum or the average value of the differences may be simply referred to as a difference). In addition, the second evaluation value calculation unit 14B calculates a sum or an average value (difference) between differences of feature quantity groups in a feature map generated from each of the correct image x and the 2D image data g(s) in each of the second and subsequent layers $\Phi\_L$ (L=2, 3, . . . ). Then, the differences calculated in the respective layers $\Phi\_L$ (L=1, 2, 3, . . . ) are totaled, and the total value or the average value is calculated as a second evaluation value B.

The image processing apparatus modifies the 2D conversion algorithm of the 2D image generation unit 13B so as to minimize the second evaluation value B calculated by the second evaluation value calculation unit 14B. Modifying of the 2D conversion algorithm of the 2D image generation unit 13B so as to minimize the second evaluation value B means that learning is performed to enhance the ability to generate the 2D image data g(s) that is almost the same as the correct image x by the 2D image generation unit 13B. When this generation capability increases, the 2D image generation unit 13B can generate 2D image data g(s) that is almost the same as the captured image data x.

<Third Pattern>

Figure 4:
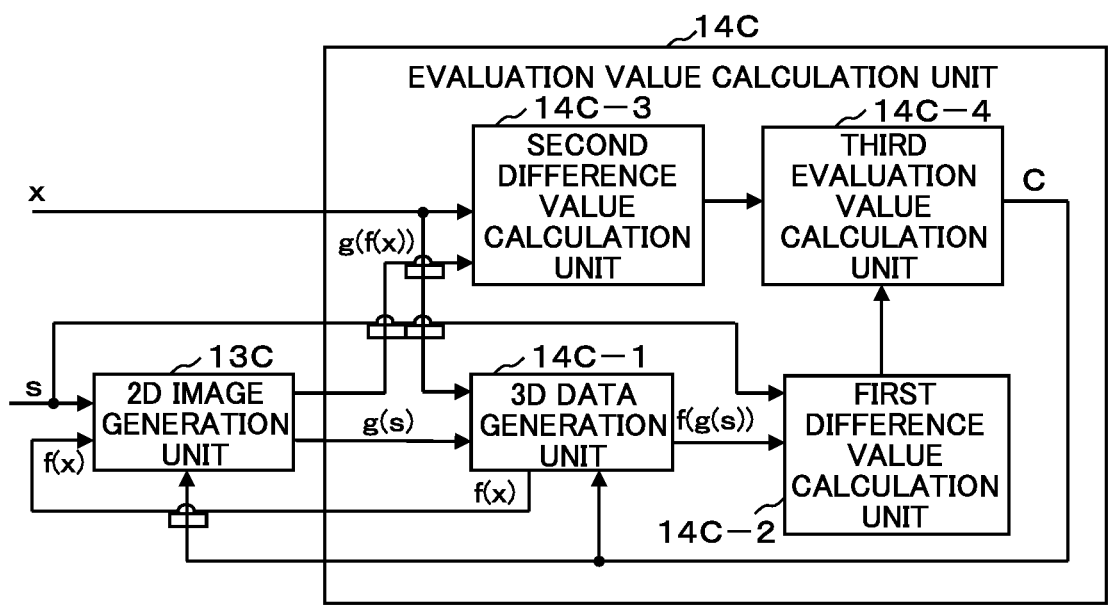
FIG. 4 is a block diagram illustrating a functional configuration example in the case of performing learning according to a third pattern.

FIG. 4 is a block diagram illustrating a functional configuration example in the case of performing learning according to a third pattern. Learning by a fourth pattern applies a learning algorithm known as so-called CycleGAN. As illustrated in FIG. 4, the image processing apparatus includes a 2D image generation unit 13C and an evaluation value calculation unit 14C as a functional configuration for performing learning according to the third pattern. The evaluation value calculation unit 14C includes a 3D data generation unit 14C-1, a first difference value calculation unit 14C-2, a second difference value calculation unit 14C-3, and a third evaluation value calculation unit 14C-4.

The 3D data generation unit 14C-1 generates 3D data of a 3D model from 2D image data according to a predetermined 3D conversion algorithm. Note that, hereinafter, this 3D conversion algorithm is represented by a symbol "f( )". As the 3D conversion algorithm used here, a known algorithm can be used. However, as will be described later, since this 3D conversion algorithm is modified by learning, the algorithm needs to be modifiable.

Note that, in the present embodiment, for example, modifying of the 3D conversion algorithm includes at least one of changing of a conversion processing logic when a value on 2D space coordinates specifying the 2D image data is converted into a value on 3D space coordinates specifying the 3D data, changing of a function or a parameter used in the conversion processing logic, or changing of a library used in the conversion processing logic.

In the present embodiment, the 3D data generation unit 14C-1 generates 3D data (hereinafter, represented by a symbol "f(x)") from the captured image data (correct image) x acquired by the correct image acquisition unit 12, and generates 3D data (hereinafter represented by a symbol "f(g(s))") from the 2D image data g(s) generated based on the 3D data s by the 2D image generation unit 13C. Generation of the 3D data f(g(s)) corresponds to a process of returning the 2D image data g(s) generated from the 3D data s to the original 3D data s (where s may not equal to f(g(s))). The 3D data f(x) generated by the 3D data generation unit 14C-1 is supplied to the 2D image generation unit 13C, and the 3D data f(g(s)) is supplied to the first difference value calculation unit 14C-2.

The 2D image generation unit 13C generates 2D image data g(s) from the 3D data s acquired by the 3D data acquisition unit 11 according to a predetermined 2D conversion algorithm. In addition, the 2D image generation unit 13C generates 2D image data g(f(x)) according to the 2D conversion algorithm based on the 3D data f(x) generated by the 3D data generation unit 14C-1 from the correct image x acquired by the correct image acquisition unit 12. Generation of the 2D image data g(f(x)) corresponds to a process of returning the 3D data f(x) generated from the correct image x to the original correct image x (where x may not equal to g(f(x))). The 2D image data g(s) generated by the 2D image generation unit 13C is supplied to the 3D data generation unit 14C-1, and the 2D image data g(f(x)) is supplied to the second difference value calculation unit 14C-3.

The first difference value calculation unit 14C-2 calculates, as a first difference value, a difference between the 3D data f(g(s)) generated by the 3D data generation unit 14C-1 from the 2D image data g(s) generated by the 2D image generation unit 13C and the 3D data s acquired by the 3D data acquisition unit 11. For example, the first difference value may correspond to a sum or an average value of differences between color values in respective coordinates of the 3D data f(g(s)) and color values in respective coordinates of the 3D data s. Here, when the 2D conversion algorithm of the 2D image generation unit 13C is perfect and the 3D conversion algorithm of the 3D data generation unit 14C-1 is perfect, the 3D data f(g(s)) and the 3D data s become the same, and the first difference value becomes zero.

The second difference value calculation unit 14C-3 calculates, as a second difference value, a difference between the 2D image data g(f(x)) generated by the 2D image generation unit 13C based on the 3D data f(x) generated by the 3D data generation unit 14C-1 from the correct image x acquired by the correct image acquisition unit 12 and the correct image x acquired by the correct image acquisition unit 12. For example, the second difference value may correspond to a sum or an average value of differences between color values at respective pixels of the 2D image data g(f(x)) and color values at respective pixels of the correct image x. Here, when the 2D conversion algorithm of the 2D image generation unit 13C is perfect and the 3D conversion algorithm of the 3D data generation unit 14C-1 is perfect, the 2D image data g(f(x)) and the correct image x become the same, and the second difference value becomes zero.

The third evaluation value calculation unit 14C-4 calculates, as a third evaluation value (hereinafter represented by a symbol "C"), a total value of the first difference value calculated by the first difference value calculation unit 14C-2 and the second difference value calculated by the second difference value calculation unit 14C-3.

The image processing apparatus modifies the 2D conversion algorithm of the 2D image generation unit 13C and the 3D conversion algorithm of the 3D data generation unit 14C-1 to minimize the third evaluation value C calculated by the third evaluation value calculation unit 14C-4. Modifying of the 2D conversion algorithm of the 2D image generation unit 13C and the 3D conversion algorithm of the 3D data generation unit 14C-1 to minimize the third evaluation value C means that learning is performed to enhance the ability to generate the 2D image data g(f(x)) that is almost the same as the correct image x by the 2D image generation unit 13C and generate the 3D data f(g(s)) that is almost the same as the 3D data s (that can be regarded as correct data of 3D data) by the 3D data generation unit 14C-1. When this generation ability increases, the 2D image generation unit 13C can generate the 2D image data g(s) that is almost the same as the captured image data x.

<Fourth Pattern>

Figure 5:
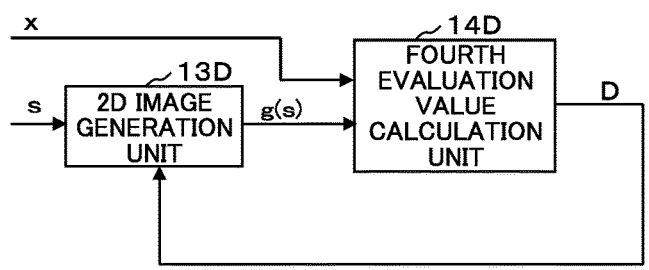
FIG. 5 is a block diagram illustrating a functional configuration example in the case of performing learning according to a fourth pattern.

FIG. 5 is a block diagram illustrating a functional configuration example in the case of performing learning according to a fourth pattern. As illustrated in FIG. 5, the image processing apparatus includes a 2D image generation unit 13D and a fourth evaluation value calculation unit 14D as a functional configuration for performing learning according to the fourth pattern.

The fourth evaluation value calculation unit 14D calculates, as a fourth evaluation value (hereinafter represented by a symbol "D"), a difference between the 2D image data g(s) generated by the 2D image generation unit 13D and the correct image x acquired by the correct image acquisition unit 12.

The image processing apparatus modifies the 2D conversion algorithm of the 2D image generation unit 13D to minimize the fourth evaluation value D calculated by the fourth evaluation value calculation unit 14D. Modifying of the 2D conversion algorithm of the 2D image generation unit 13D to minimize the fourth evaluation value D means that learning is performed to enhance the ability to generate the 2D image data g(s) that is almost the same as the correct image x by the 2D image generation unit 13D. When this generation ability increases, the 2D image generation unit 13D can generate 2D image data g(s) that is almost the same as the captured image data x.

Note that, the evaluation value calculation unit 14 may be configured to include only one of the first pattern to the fourth pattern illustrated in FIG. 2 to FIG. 5, or may include at least two of the first pattern to the fourth pattern and modify the 2D conversion algorithm to optimize each of evaluation values calculated by the at least two patterns. Note that, when the first pattern is included in the at least two patterns, the identification algorithm of the first evaluation value calculation unit 14A is further modified to minimize the first evaluation value A calculated by the first evaluation value calculation unit 14A using the 2D image data g(s) as an input and maximize the first evaluation value A calculated by the first evaluation value calculation unit 14A using the correct image x as an input. In addition, when the third pattern is included in the at least two patterns, the 3D conversion algorithm of the 3D data generation unit 14C-1 is further modified to minimize the third evaluation value C.

Figure 6:
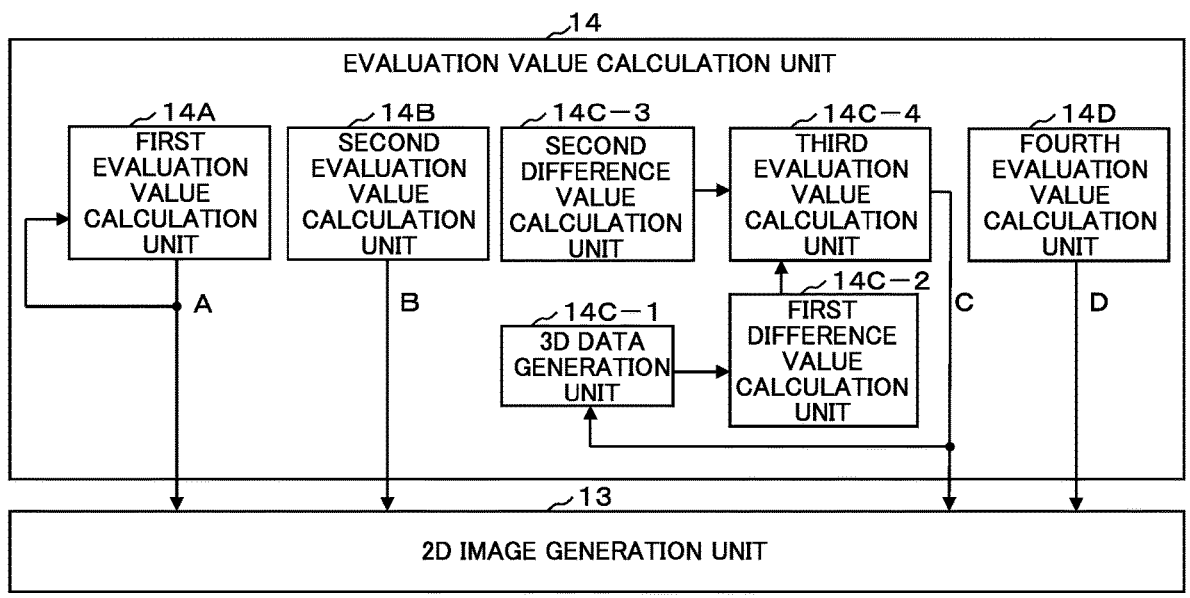
FIG. 6 is a block diagram illustrating a functional configuration example in the case of performing learning by applying all of the first pattern to the fourth pattern.

FIG. 6 is a block diagram illustrating a functional configuration example of an evaluation value calculation unit 14 in the case of applying all of the first pattern to the fourth pattern. Note that, even though illustration is simplified here, detailed configurations of respective patterns are as illustrated in FIG. 2 to FIG. 5. In this case, the 2D image generation unit 13 modifies the 2D conversion algorithm to optimize (maximize or minimize) each of the evaluation values A to D calculated by each of the evaluation value calculation units 14A to 14D. In addition, the evaluation value calculation unit 14 modifies the identification algorithm of the first evaluation value calculation unit 14A to minimize the first evaluation value A calculated by the first evaluation value calculation unit 14A using the 2D image data g(s) as an input and maximize the first evaluation value A calculated by the first evaluation value calculation unit 14A using the correct image x as an input, and modifies the 3D conversion algorithm of the 3D data generation unit 14C-1 to minimize the third evaluation value C.

Note that, instead of optimizing each of evaluation values calculated by at least two of the first to fourth patterns, the 2D image generation unit 13 may weight and add the evaluation values calculated by the at least two patterns, and modify the 2D conversion algorithm to optimize a weighted addition value. For example, in the configuration illustrated in FIG. 6, the 2D image generation unit 13 may calculate a weighted evaluation value H that is $H=\alpha A+\beta B+\gamma C+\delta D$ ($\alpha$, $\beta$, $\gamma$, and $\delta$ are weighting coefficients, respectively, which can be set to arbitrary values including zero), and modify the 2D conversion algorithm to minimize the weighted evaluation value H.

In addition, the entire embodiment is merely an example of implementation in carrying out the invention, and the technical scope of the invention should not be construed in a limited manner. That is, the invention can be implemented in various forms without departing from a subject matter or a main feature thereof.

REFERENCE SIGNS LIST 11 3D data acquisition unit
12 Correct image acquisition unit
13, 13A to 13D 2D image generation unit
14 Evaluation value calculation unit
14A First evaluation value calculation unit
14B Second evaluation value calculation unit
14C-1 3D data generation unit
14C-2 First difference value calculation unit
14C-3 Second difference value calculation unit
14C-4 Third evaluation value calculation unit
14D Fourth evaluation value calculation unit

The invention claimed is:

1. An image processing apparatus comprising:
a three-dimensional (3D) data acquisition unit that acquires 3D data of a 3D model in which a captured image is mapped on a surface;
a correct image acquisition unit that acquires captured image data used as a correct image;
a two-dimensional (2D) image generation unit that generates 2D image data from the 3D data acquired by the 3D data acquisition unit according to a predetermined 2D conversion algorithm; and
an evaluation value calculation unit that calculates an evaluation value representing similarity between the 2D image data generated by the 2D image generation unit and the captured image data acquired by the correct image acquisition unit,
wherein
the 2D image generation unit modifies the 2D conversion algorithm by learning to optimize the evaluation value calculated each time for 2D image data generated when the 3D data is input to the 2D image generation unit and processing is repeatedly performed,
the evaluation value calculation unit includes a first evaluation value calculation unit that uses the 3D data acquired by the 3D data acquisition unit, and the captured image data acquired by the correct image acquisition unit or the 2D image data generated by the 2D image generation unit as an input, identifies whether an input image is a correct image or the 2D image data generated by the 2D image generation unit according to a predetermined identification algorithm, and calculates a probability that the input image is identified as the correct image as a first evaluation value, and
the 2D conversion algorithm of the 2D image generation unit is modified to maximize the first evaluation value calculated by the first evaluation value calculation unit using the 2D image data as an input, and the identification algorithm of the first evaluation value calculation unit is modified to minimize the first evaluation value calculated by the first evaluation value calculation unit using the 2D image data as an input and maximize the first evaluation value calculated by the first evaluation value calculation unit using the captured image data as an input.

2. An image processing apparatus comprising:
a three-dimensional (3D) data acquisition unit that acquires 3D data of a 3D model in which a captured image is mapped on a surface;
a correct image acquisition unit that acquires captured image data used as a correct image;
a two-dimensional (2D) image generation unit that generates 2D image data from the 3D data acquired by the 3D data acquisition unit according to a predetermined 2D conversion algorithm; and
an evaluation value calculation unit that calculates an evaluation value representing similarity between the 2D image data generated by the 2D image generation unit and the captured image data acquired by the correct image acquisition unit,
wherein
the 2D image generation unit modifies the 2D conversion algorithm by learning to optimize the evaluation value calculated each time for 2D image data generated when the 3D data is input to the 2D image generation unit and processing is repeatedly performed,
the evaluation value calculation unit includes a second evaluation value calculation unit that has a learned neural network for image classification of the 2D the image data and calculates, as a second evaluation value, a total value or an average value of differences between values related to the captured image data acquired by the correct image acquisition unit and the 2D image data generated by the 2D image generation unit, respectively, in each layer included in the neural network, and
the 2D conversion algorithm of the 2D image generation unit is modified to minimize the second evaluation value calculated by the second evaluation value calculation unit.

3. An image processing apparatus comprising:
a three-dimensional (3D) data acquisition unit that acquires 3D data of a 3D model in which a captured image is mapped on a surface;
a correct image acquisition unit that acquires captured image data used as a correct image;
a two-dimensional (2D) image generation unit that generates 2D image data from the 3D data acquired by the 3D data acquisition unit according to a predetermined 2D conversion algorithm; and
an evaluation value calculation unit that calculates an evaluation value representing similarity between the 2D image data generated by the 2D image generation unit and the captured image data acquired by the correct image acquisition unit,
wherein
the 2D image generation unit modifies the 2D conversion algorithm by learning to optimize the evaluation value calculated each time for 2D image data generated when the 3D data is input to the 2D image generation unit and processing is repeatedly performed, the evaluation value calculation unit includes
a 3D data generation unit that generates 3D data of a 3D model from image data according to a predetermined 3D conversion algorithm,
a first difference value calculation unit that calculates, as a first difference value, a difference between 3D data generated by the 3D data generation unit from the 2D image data generated by the 2D image generation unit and the 3D data acquired by the 3D data acquisition unit,
a second difference value calculation unit that calculates, as a second difference value, a difference between 2D image data generated by the 2D image generation unit based on 3D data generated by the 3D data generation unit from the captured image data acquired by the correct image acquisition unit and the captured image data acquired by the correct image acquisition unit, and
a third evaluation value calculation unit that calculates, as a third evaluation value, a total value of the first difference value calculated by the first difference value calculation unit and the second difference value calculated by the second difference value calculation unit, and
the 2D conversion algorithm of the 2D image generation unit and the 3D conversion algorithm of the 3D data generation unit are modified to minimize the third evaluation value calculated by the third evaluation value calculation unit.

4. An image processing apparatus comprising:
a three-dimensional (3D) data acquisition unit that acquires 3D data of a 3D model in which a captured image is mapped on a surface;
a correct image acquisition unit that acquires captured image data used as a correct image;
a two-dimensional (2D) image generation unit that generates 2D image data from the 3D data acquired by the 3D data acquisition unit according to a predetermined 2D conversion algorithm; and
an evaluation value calculation unit that calculates an evaluation value representing similarity between the 2D image data generated by the 2D image generation unit and the captured image data acquired by the correct image acquisition unit,
wherein
the 2D image generation unit modifies the 2D conversion algorithm by learning to optimize the evaluation value calculated each time for 2D image data generated when the 3D data is input to the 2D image generation unit and processing is repeatedly performed,
the evaluation value calculation unit includes at least two of
a first evaluation value calculation unit that uses the 3D data acquired by the 3D data acquisition unit, and the captured image data acquired by the correct image acquisition unit or the 2D image data generated by the 2D image generation unit as an input, identifies whether an input image is a correct image or the 2D image data generated by the 2D image generation unit according to a predetermined identification algorithm, and calculates a probability that the input image is the correct image as a first evaluation value,
a second evaluation value calculation unit that has a learned neural network for image classification of the 2D image data and calculates, as a second evaluation value, a total value or an average value of differences between feature quantities generated from the captured image data acquired by the correct image acquisition unit and the 2D image data generated by the 2D image generation unit, respectively, in each layer included in the neural network,
a third evaluation value calculation unit that calculates, as a first difference value, a difference between 3D data generated according to a predetermined 3D conversion algorithm from the 2D image data generated by the 2D image generation unit and the 3D data acquired by the 3D data acquisition unit, calculates, as a second difference value, a difference between 2D image data generated by the 2D image generation unit based on 3D data generated according to the predetermined 3D conversion algorithm from the captured image data acquired by the correct image acquisition unit and the captured image data acquired by the correct image acquisition unit, and calculates a total value of the calculated first difference value and second difference value as a third evaluation value, and
a fourth evaluation value calculation unit that calculates, as a fourth evaluation value, a difference between the 2D image data generated by the 2D image generation unit and the captured image data acquired by the correct image acquisition unit, and
the 2D conversion algorithm is modified to optimize each of evaluation values calculated by the at least two units, the identification algorithm is further modified to minimize the first evaluation value calculated by the first evaluation value calculation unit using the 2D image data as an input and maximize the first evaluation value calculated by the first evaluation value calculation unit using the captured image data as an input when the first evaluation value calculation unit is included in the at least two units, and the 3D conversion algorithm is further modified to minimize the third evaluation value when the third evaluation value calculation unit is included in the at least two units.

5. The image processing apparatus according to claim 4, wherein instead of optimizing each of evaluation values calculated by the at least two units, the evaluation values calculated by the at least two units are weighted and added, and the 2D conversion algorithm is modified to optimize a weighted addition value.

6. An image generation program stored on a non-transitory computer readable medium for causing a computer to function as:
3D data acquisition means that acquires 3D data of a 3D model in which a captured image is mapped on a surface,
correct image acquisition means that acquires captured image data used as a correct image,
2D image generation means that generates 2D image data according to a predetermined 2D conversion algorithm from the 3D data acquired by the 3D data acquisition means, and
evaluation value calculation means that calculates an evaluation value representing similarity between the 2D image data generated by the 2D image generation means and the captured image data acquired by the correct image acquisition means
wherein
the 2D image generation means modifies the 2D conversion algorithm by learning to optimize the evaluation value calculated each time for the 2D image data generated when 3D data is input to the 2D image generation means and processing is repeatedly performed, the evaluation value calculation means functions as a first evaluation value calculation means that uses the 3D data acquired by the 3D data acquisition means, and the captured image data acquired by the correct image acquisition means or the 2D image data generated by the 2D image generation means as an input, identifies whether an input image is a correct image or the 2D image data generated by the 2D image generation means according to a predetermined identification algorithm, and calculates a probability that the input image is identified as the correct image as a first evaluation value, and the 2D conversion algorithm of the 2D image generation means is modified to maximize the first evaluation value calculated by the first evaluation value calculation means using the 2D image data as an input, and the identification algorithm of the first evaluation value calculation means is modified to minimize the first evaluation value calculated by the first evaluation value calculation means using the 2D image data as an input and maximize the first evaluation value calculated by the first evaluation value calculation means using the captured image data as an input.

7. An image generation program stored on a non-transitory computer readable medium for causing a computer to function as:
  a three-dimensional (3D) data acquisition means that acquires 3D data of a 3D model in which a captured image is mapped on a surface;
  a correct image acquisition means that acquires captured image data used as a correct image;
  a two-dimensional (2D) image generation means that generates 2D image data from the 3D data acquired by the 3D data acquisition means according to a predetermined 2D conversion algorithm; and
  an evaluation value calculation means that calculates an evaluation value representing similarity between the 2D image data generated by the 2D image generation means and the captured image data acquired by the correct image acquisition means,
  wherein
  the 2D image generation means modifies the 2D conversion algorithm by learning to optimize the evaluation value calculated each time for 2D image data generated when the 3D data is input to the 2D image generation means and processing is repeatedly performed,
  the evaluation value calculation means functions as a second evaluation value calculation means that has a learned neural network for image classification of the 2D the image data and calculates, as a second evaluation value, a total value or an average value of differences between values related to the captured image data acquired by the correct image acquisition means and the 2D image data generated by the 2D image generation means, respectively, in each layer included in the neural network, and
  the 2D conversion algorithm of the 2D image generation means is modified to minimize the second evaluation value calculated by the second evaluation value calculation means.

8. An image generation program stored on a non-transitory computer readable medium for causing a computer to function as:
  a three-dimensional (3D) data acquisition means that acquires 3D data of a 3D model in which a captured image is mapped on a surface;
  a correct image acquisition means that acquires captured image data used as a correct image;
  a two-dimensional (2D) image generation means that generates 2D image data from the 3D data acquired by the 3D data acquisition means according to a predetermined 2D conversion algorithm; and
  an evaluation value calculation means that calculates an evaluation value representing similarity between the 2D image data generated by the 2D image generation means and the captured image data acquired by the correct image acquisition means,
  wherein
  the 2D image generation means modifies the 2D conversion algorithm by learning to optimize the evaluation value calculated each time for 2D image data generated when the 3D data is input to the 2D image generation means and processing is repeatedly performed,
  the evaluation value calculation means functions as
  a 3D data generation means that generates 3D data of a 3D model from image data according to a predetermined 3D conversion algorithm,
  a first difference value calculation means that calculates, as a first difference value, a difference between 3D data generated by the 3D data generation means from the 2D image data generated by the 2D image generation means and the 3D data acquired by the 3D data acquisition means,
  a second difference value calculation means that calculates, as a second difference value, a difference between 2D image data generated by the 2D image generation means based on 3D data generated by the 3D data generation means from the captured image data acquired by the correct image acquisition means and the captured image data acquired by the correct image acquisition means, and
  a third evaluation value calculation means that calculates, as a third evaluation value, a total value of the first difference value calculated by the first difference value calculation means and the second difference value calculated by the second difference value calculation means, and
  the 2D conversion algorithm of the 2D image generation means and the 3D conversion algorithm of the 3D data generation means are modified to minimize the third evaluation value calculated by the third evaluation value calculation means.

9. An image generation program stored on a non-transitory computer readable medium for causing a computer to function as:
  a three-dimensional (3D) data acquisition means that acquires 3D data of a 3D model in which a captured image is mapped on a surface;
  a correct image acquisition means that acquires captured image data used as a correct image;
  a two-dimensional (2D) image generation means that generates 2D image data from the 3D data acquired by the 3D data acquisition means according to a predetermined 2D conversion algorithm; and
  an evaluation value calculation means that calculates an evaluation value representing similarity between the 2D image data generated by the 2D image generation means and the captured image data acquired by the correct image acquisition means,
  wherein
  the 2D image generation means modifies the 2D conversion algorithm by learning to optimize the evaluation value calculated each time for 2D image data generated when the 3D data is input to the 2D image generation means and processing is repeatedly performed, the evaluation value calculation means functions as at least two of a first evaluation value calculation means that uses the 3D data acquired by the 3D data acquisition means, and the captured image data acquired by the correct image acquisition means or the 2D image data generated by the 2D image generation means as an input, identifies whether an input image is a correct image or the 2D image data generated by the 2D image generation means according to a predetermined identification algorithm, and calculates a probability that the input image is the correct image as a first evaluation value, a second evaluation value calculation means that has a learned neural network for image classification of the 2D image data and calculates, as a second evaluation value, a total value or an average value of differences between feature quantities generated from the captured image data acquired by the correct image acquisition means and the 2D image data generated by the 2D image generation means, respectively, in each layer included in the neural network, a third evaluation value calculation means that calculates, as a first difference value, a difference between 3D data generated according to a predetermined 3D conversion algorithm from the 2D image data generated by the 2D image generation means and the 3D data acquired by the 3D data acquisition means, calculates, as a second difference value, a difference between 2D image data generated by the 2D image generation means based on 3D data generated according to the predetermined 3D conversion algorithm from the captured image data acquired by the correct image acquisition means and the captured image data acquired by the correct image acquisition means, and calculates a total value of the calculated first difference value and second difference value as a third evaluation value, and a fourth evaluation value calculation means that calculates, as a fourth evaluation value, a difference between the 2D image data generated by the 2D image generation means and the captured image data acquired by the correct image acquisition means, and the 2D conversion algorithm is modified to optimize each of evaluation values calculated by the at least two means, the identification algorithm is further modified to minimize the first evaluation value calculated by the first evaluation value calculation means using the 2D image data as an input and maximize the first evaluation value calculated by the first evaluation value calculation means using the captured image data as an input when the first evaluation value calculation means is included in the at least two means, and the 3D conversion algorithm is further modified to minimize the third evaluation value when the third evaluation value calculation means is included in the at least two means.

10. The image generation program according to claim 9, wherein instead of optimizing each of evaluation values calculated by the at least two means, the evaluation values calculated by the at least two means are weighted and added, and the 2D conversion algorithm is modified to optimize a weighted addition value.

* * * * *